United States Patent
Li et al.

(10) Patent No.: US 10,110,038 B2
(45) Date of Patent: *Oct. 23, 2018

(54) MOBILE TERMINAL AND RAPID CHARGING METHOD

(71) Applicant: HISENSE MOBILE COMMUNICATIONS TECHNOLOGY CO., LTD., Qingdao (CN)

(72) Inventors: Chunqian Li, Qingdao (CN); Yaling Huang, Qingdao (CN); Yufeng Zhao, Qingdao (CN); Naifeng Zhang, Qingdao (CN); Wenjuan Du, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 178 days.

This patent is subject to a terminal disclaimer.

(21) Appl. No.: 15/062,658

(22) Filed: Mar. 7, 2016

(65) Prior Publication Data

US 2017/0040822 A1    Feb. 9, 2017

(30) Foreign Application Priority Data

Aug. 5, 2015   (CN) .......................... 2015 1 0473427

(51) Int. Cl.
*H02J 7/06* (2006.01)
*H02J 7/24* (2006.01)
*H02J 7/00* (2006.01)

(52) U.S. Cl.
CPC .......... *H02J 7/0072* (2013.01); *H02J 7/0004* (2013.01); *H02J 7/0052* (2013.01); *H02J 2007/0062* (2013.01)

(58) Field of Classification Search
CPC ...... H02J 7/0072; H02J 7/0004; H02J 7/0052; H02J 2007/0062
See application file for complete search history.

(56) References Cited

U.S. PATENT DOCUMENTS 7,528,574 B1 *  5/2009  Adkins ................. H01M 10/44
                                                              320/128
9,197,086 B2 * 11/2015  Zhou ..................... H02J 7/0052
(Continued)

FOREIGN PATENT DOCUMENTS

| CN | 201590668 | 9/2010 |
| CN | 103236568 | 8/2013 |

(Continued)

OTHER PUBLICATIONS

Office Action from related Chinese Application No. 201510473336.4 dated Jan. 4, 2017 (10 pages).
(Continued)

*Primary Examiner* — Nha Nguyen
(74) *Attorney, Agent, or Firm* — Harness, Dickey & Pierce, P.L.C.

(57) ABSTRACT

The disclosure discloses a mobile terminal and a rapid charging method, where the mobile terminal includes a microprocessor configured to detect voltage of a battery core thereof upon detecting that the USB interface is connected with the DC-charging power source adaptor, if the voltage of the battery core is in a range [S1, S2] delimited by preset DC-charging thresholds, to calculate a target charging voltage value $V_{out}$ from the voltage of the battery core, the maximum terminal voltage supported by the battery as well as at least one of a resistance value on a charging line, a
(Continued)

resistance value on a circuit board of the mobile terminal, an inner resistance of the battery, and to send the target charging voltage value $V_{out}$ to the DC-charging power source adaptor to control the DC-charging power source adaptor to output charging voltage to DC-charge the battery.

15 Claims, 5 Drawing Sheets

(56) References Cited

U.S. PATENT DOCUMENTS

| | | | |
|---|---|---|---|
| 9,300,159 B2* | 3/2016 | Sun | H02J 7/0083 |
| 2005/0001590 A1 | 1/2005 | Bayne et al. | |
| 2007/0188134 A1* | 8/2007 | Hussain | H01M 10/44 |
| | | | 320/114 |
| 2008/0061733 A1 | 3/2008 | Toya | |
| 2008/0100143 A1* | 5/2008 | Lipcsei | H02J 7/0068 |
| | | | 307/80 |
| 2009/0184687 A1* | 7/2009 | Schroeder | H01M 10/44 |
| | | | 320/162 |
| 2010/0115147 A1 | 5/2010 | Kim | |
| 2011/0279078 A1 | 11/2011 | Hara et al. | |
| 2014/0015507 A1* | 1/2014 | Park | G05F 1/46 |
| | | | 323/304 |
| 2014/0167706 A1* | 6/2014 | Sun | H02J 7/0081 |
| | | | 320/160 |
| 2014/0203761 A1* | 7/2014 | Paparrizos | H02M 3/1582 |
| | | | 320/107 |
| 2016/0094084 A1 | 3/2016 | Sotani et al. | |
| 2016/0214500 A1* | 7/2016 | Kim | B60L 11/1861 |
| 2016/0261127 A1 | 9/2016 | Worry et al. | |
| 2016/0336779 A1 | 11/2016 | Hu et al. | |
| 2016/0352132 A1 | 12/2016 | Zhang et al. | |
| 2017/0040804 A1 | 2/2017 | Hu et al. | |
| 2017/0040805 A1 | 2/2017 | Huang et al. | |
| 2017/0040810 A1 | 2/2017 | Hu et al. | |
| 2017/0040812 A1 | 2/2017 | Li et al. | |
| 2017/0066342 A1* | 3/2017 | Butler | B60L 11/1846 |

FOREIGN PATENT DOCUMENTS

| | | |
|---|---|---|
| CN | 103872398 | 6/2014 |
| CN | 102880238 | 7/2015 |
| CN | 104796011 | 7/2015 |
| CN | 103872398 B | 9/2016 |
| JP | 2007267498 | 10/2007 |
| WO | WO-2012086788 A1 | 6/2012 |

OTHER PUBLICATIONS

Office Action from related Chinese Application No. 201510473429.7 dated Aug. 1, 2017 (8 pages).
Office Action from related Chinese Application No. 201510473429.7 dated Dec. 8, 2016 (9 pages).
Office Action from related Chinese Application No. 201510473321.8 dated Oct. 8, 2016 (4 pages).
Office Action from related Chinese Application No. 201510473321.8 dated Jun. 15, 2017 (5 pages).
Office Action from related Chinese Application No. 201510473321.8 dated Sep. 26, 2017 (5 pages).
U.S. Appl. No. 15/052,007, filed Feb. 24, 2016, Yaling Huang.
U.S. Appl. No. 15/051,799, filed Feb. 24, 2016, Chunqian Li et al.
U.S. Appl. No. 15/076,832, filed Mar. 22, 2016, Chunqian Li et al.

* cited by examiner

MOBILE TERMINAL AND RAPID CHARGING METHOD

CROSS-REFERENCE TO RELATED APPLICATION

This application claims the benefit and priority of Chinese Patent Application No. 201510473427.8 filed Aug. 5, 2015. The entire disclosure of the above application is incorporated herein by reference.

FIELD

The present disclosure relates to the field of Direct-Current (DC) charging and particularly to a method for charging rapidly a battery in a mobile terminal, and a mobile terminal designed based upon the charging method.

BACKGROUND

This section provides background information related to the present disclosure which is not necessarily prior art.

At present, portable mobile terminals have been widely applied in numerous aspects of people's life, and have become a leading factor in the development of the semiconductor industry. The majority of the existing portable mobile terminals are provided with chargeable batteries to power system circuits in the mobile terminals. As an increasing number of functions supported by the portal mobile terminals are emerging, their system circuits also consume more and more power, and given a limited capacity of the batteries, the mobile terminals operate for a shorter and shorter period of time after the batteries are charged, so that the batteries have to be charged more and more frequently.

The batteries have been widely charged currently in two general schemes: in one of the schemes, the batteries are charged by a general power source adaptor (charger), i.e., in the normal DCP charging scheme, where the general power source adaptor generally supports an output of only fixed voltage, e.g., 5V, 9V, 12V, etc.; and in the other scheme, the batteries are charged by a host (e.g., a computer, etc.), i.e., in the SDP charging scheme.

SUMMARY

This section provides a general summary of the disclosure, and is not a comprehensive disclosure of its full scope or all of its features.

An embodiment of the disclosure provides a rapid charging method including: detecting, by a mobile terminal, voltage of a battery core of the mobile terminal; if the voltage of the battery core is in a range [S1, S2] delimited by preset DC-charging thresholds, then calculating a target charging voltage value $V_{out}$ from the voltage of the battery core, and the maximum terminal voltage supported by the battery as well as at least one of a resistance value on a charging line, a resistance value on a circuit board of the mobile terminal, and an inner resistance of the battery, and sending the target charging voltage value $V_{out}$ to a DC-charging power source adaptor; and transmitting, by the mobile terminal, received charging voltage output by the DC-charging power source adaptor to the battery to DC-charge the battery, wherein the charging voltage is a target charging voltage determined by the DC-charging power source adaptor from the received target charging voltage value $V_{out}$.

Based upon the rapid charging method above, an embodiment of the disclosure further provides a mobile terminal including a battery, a USB interface, and a microprocessor, wherein the battery is configured to store electric energy; the USB interface is configured to be connected with a DC-charging power source adaptor; and the microprocessor is configured the battery is configured to store electric energy; the USB interface is configured to be connected with a DC-charging power source adaptor; and the microprocessor is configured to detect voltage of a battery core thereof upon detecting that the USB interface is connected with the DC-charging power source adaptor, and if the voltage of the battery core is in a range [S1, S2] delimited by preset DC-charging thresholds, to calculate a target charging voltage value $V_{out}$ from the voltage of the battery core, and the maximum terminal voltage supported by the battery as well as at least one of a resistance value on a charging line, a resistance value on a circuit board of the mobile terminal, and an inner resistance of the battery, and to send the target charging voltage value $V_{out}$ to the DC-charging power source adaptor to control the DC-charging power source adaptor to output charging voltage to DC-charge the battery, wherein the charging voltage is a target charging voltage determined by the DC-charging power source adaptor from the received target charging voltage value $V_{out}$.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In the disclosure, a rapid charging method is designed for a power source adaptor outputting dynamically adjustable voltage, where a target charging voltage value corresponding to varying voltage of a core of a battery being charged is calculated to thereby adjust dynamically a volt value of charging voltage output by the power source adaptor so that the charging voltage can follow in real time the varying voltage of the battery core, and a mobile terminal can be charged at substantially stable large current. Charging current output by the power source adaptor is transmitted directly to the battery to DC-charge the battery, and since the charging current is greatly improved, charging of the battery can be speeded up, and a period of time taken to charge the mobile terminal once will be shortened, to thereby alleviate such an influence upon a user in his or her daily access to the mobile terminal that arises from the mobile terminal being frequently charged for a long period of time, and to greatly improve the satisfactory of the user with the mobile terminal.

In the disclosure, in order to make full use of such a characteristic of the DC-charging power adaptor that the output voltage thereof is dynamically adjustable, to thereby significantly speed up charging, firstly the mobile terminal in which the chargeable battery is built is adapted in hardware to enable the mobile terminal to support both a normal charging mode in which the battery is charged by a power source managing chip in the mobile terminal, and a DC-charging mode in which a charging power source is transmitted directly to the battery to DC-charge the battery at large current. Then software program is designed for the adapted hardware circuits to adjust dynamically the charging voltage output by the DC-charging power adaptor, and to control the mobile terminal to enter the different charging modes, in response to the real-time change in voltage of the battery core being charged, so as to make reasonable use of the charging power source and to shorten the period of time for charging the battery.

Firstly hardware configurations of the mobile terminal and the DC-charging power source adaptor will be described below with reference to FIG. 1.

Figure 1:
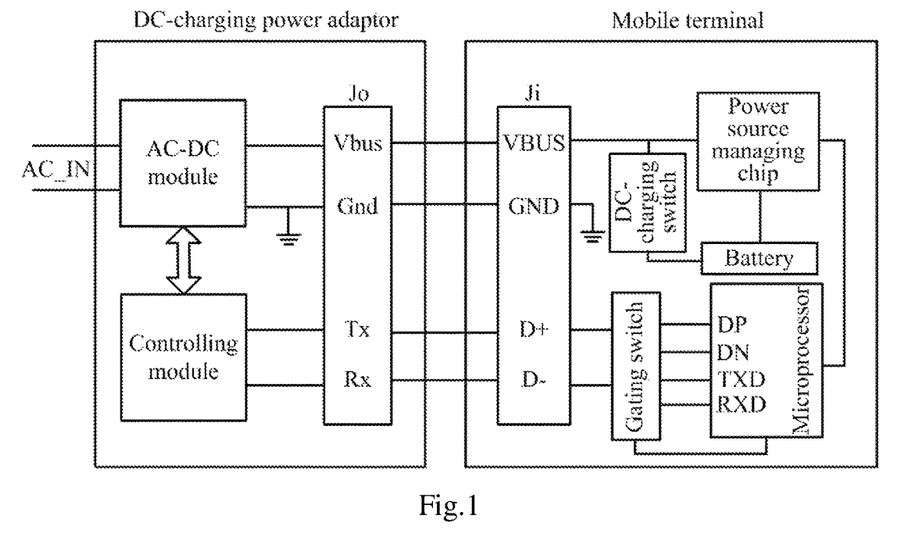
FIG. 1 is a circuit scheme block diagram of an embodiment of a mobile terminal connected with a DC-charging power source adaptor according to the disclosure.

As illustrated in FIG. 1, in order to maintain the existing traditional charging function of the mobile terminal so that the mobile terminal can be normally engaged with and charged by the existing host and normal power source adaptor, the existing charging interface of the mobile terminal is maintained in this embodiment, i.e., an interface reused for both charging and transmitting data, e.g., the currently widely applied USB interface Ji, so that the mobile terminal can be engaged with and powered by the normal power source adaptor and computer host in the market, which are currently manufactured by the majority of the manufactures. For the power pin VBUS in the USB interface Ji, in this embodiment, one end thereof is connected with a power source managing chip in the mobile terminal, and another end thereof is connected with the battery through a DC-charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with a system ground of the mobile terminal so that the mobile terminal can be grounded together with the external device if the mobile terminal is engaged with the external device. The differential data pins D+ and D− in the USB interface Ji are connected with the microprocessor through a gating switch, which can be a double-pole double-throw switch, to receive a control signal output by the microprocessor, where if the externally connected charging device is the host or the normal power source adaptor, then the differential data pins D+ and D− of the USB interface Ji will be connected with the differential data interfaces DP and DN of the microprocessor through the gating switch; and if it is detected that the externally connected charging device is neither the host nor the normal power source adaptor, then the gating switch will be controlled by the microprocessor to switch the differential data pins D+ and D− of the USB interface Ji to be connected with the UART interfaces TXD and RXD of the microprocessor to thereby identify in the UART communication mode whether the inserted external device is the DC-charging power source adaptor.

The microprocessor in the mobile terminal can be designed to initiate on its own initiative a communication command to the externally connected charging device in the UART communication mode after the differential data pins D+ and D− of the USB interface Ji are switched to be connected with the UART interfaces TXD and RXD of the microprocessor, and if a valid command fed back by the external charging device is received, to determine that the inserted external device is the DC-charging power source adaptor; or if there is no valid command fed back, to disconnect the UART interfaces TXD and RXD of the microprocessor from the differential data pins D+ and D− of the USB interface Ji without starting the charging mode, or to further output an alert "Inserted Device Can Not Be Identified".

In this embodiment, the DC-charging power source adaptor is configured in the UART communication mode instead of the $I^2C$ bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power adaptor to thereby improve the safety of the mobile terminal being charged.

Of course, communication between the mobile terminal and the DC-charging power adaptor can alternatively be designed in another communication mode than UART (e.g., the $I^2C$ bus communication mode, etc.). For example, the mobile terminal and the DC-charging power adaptor can be designed to exchange data in wireless communication with each other. Particularly, matching wireless communication modules, e.g., Bluetooth modules, WiFi modules, etc., can be arranged respectively in the mobile terminal and the DC-charging power adaptor, and if the mobile terminal needs to exchange a communication instruction with the DC-charging power adaptor, then the communication instructions generated by the mobile terminal and the DC-charging power source adaptor can be sent to the wireless communication modules for conversion into wireless signals sent to the opposite wireless communication modules, so that such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

With the mobile terminal adapted in hardware as described above, the rapid charging method according to this embodiment will be described below with reference to FIG. 2 to FIG. 5.

Figure 2:
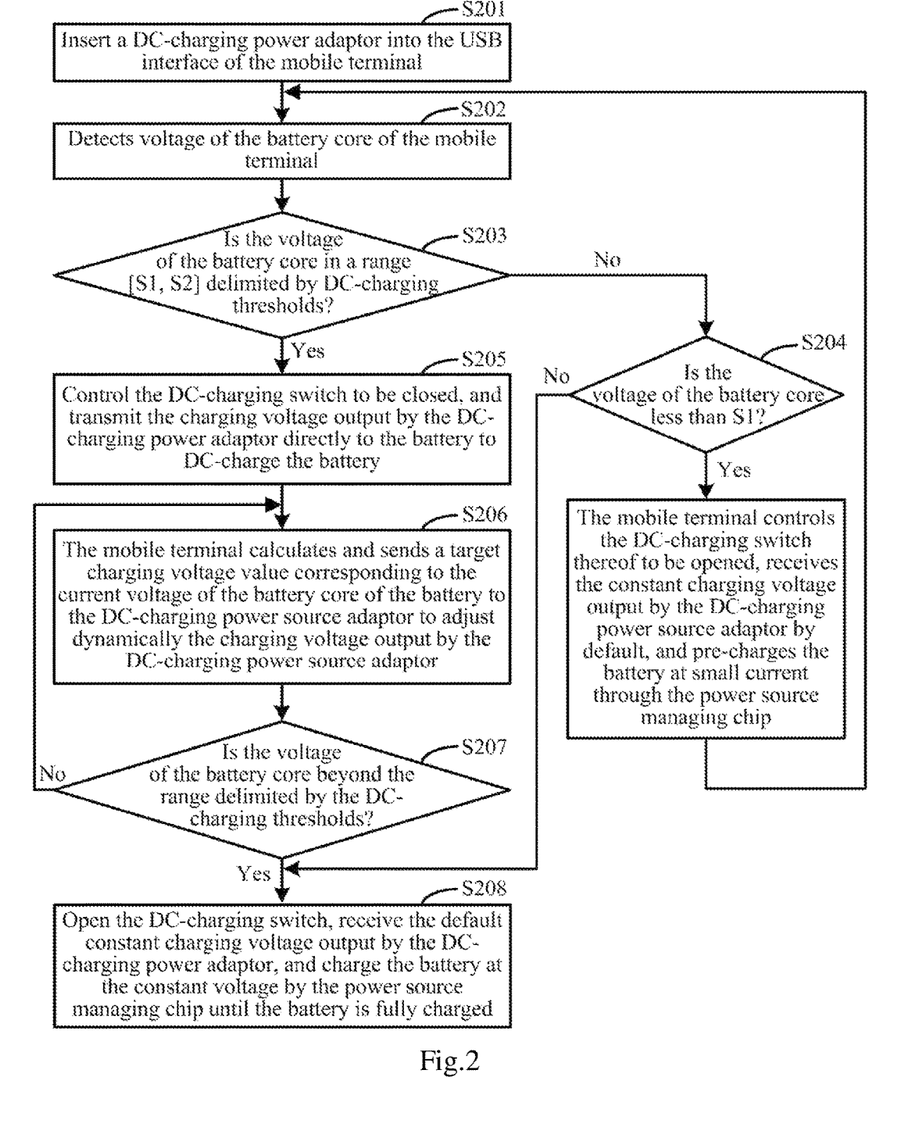
FIG. 2 is a flow chart of a process of an embodiment of a rapid charging method according to the disclosure.

As illustrated in FIG. 2, the rapid charging method generally involves the following steps:

S201. The mobile terminal detects a DC-charging power adaptor being inserted into the USB interface Ji thereof, and performs subsequent steps upon detecting a DC-charging power adaptor being inserted.

In this embodiment, the DC-charging power adaptor can be configured to output the same constant charging voltage as the charging voltage provided by the host and the normal power source adaptor, e.g., 5V constant charging voltage, if no target charging voltage value $V_{out}$ sent by the mobile terminal is received, to thereby accommodate an input power source as required for the power source managing chip in the mobile terminal.

Of course the 5V constant charging voltage here only relates to an embodiment, and in a real application, the DC-charging power adaptor will be simply configured to output the same constant charging voltage as the charging voltage output by the normal power source adaptor when the normal power source adaptor powers the mobile terminal.

S202. The mobile terminal detects voltage of the battery core thereof;

S203. It is determined whether the voltage of the battery core is in a range [S1, S2] delimited by DC-charging thresholds, and if so, then the flow proceeds to the step S205; otherwise, the flow proceeds to the step S204.

In this embodiment, the DC-charging thresholds (a lower voltage threshold S1 and an upper voltage threshold S2) can be determined particularly dependent upon the real condition of the battery to preferably agree with the voltage range of the battery core corresponding to the constant-current charging phase in the normal DCP charging mode (i.e., the traditional charging mode in which the battery is charged by the normal power source adaptor). For example, the lower voltage threshold S1 and the upper voltage threshold S2 of a 4.2V chargeable battery can be set to S1=3.5V and S2=4.1V.

S204. It is determined whether the voltage of the battery core is less than S1, and if so, then the DC-charging switch is controlled to be kept in an Off state, and also the power source managing chip is started to receive the constant charging voltage provided by the DC-charging power adaptor, e.g., DC 5V charging voltage, to pre-charge the battery at small current, and the flow returns to the step S202; otherwise, the flow jumps to the step S209.

S205. The mobile terminal controls the DC-charging switch to be closed to short the power source managing chip so that the power source managing chip stops operating, and transmits the charging voltage output by the DC-charging power adaptor directly to the battery to DC-charge the battery.

S206. The mobile terminal communicates with the DC-charging power adaptor, and adjusts dynamically the charging voltage output by the DC-charging power source adaptor to the varying voltage of the battery core.

Figure 3:
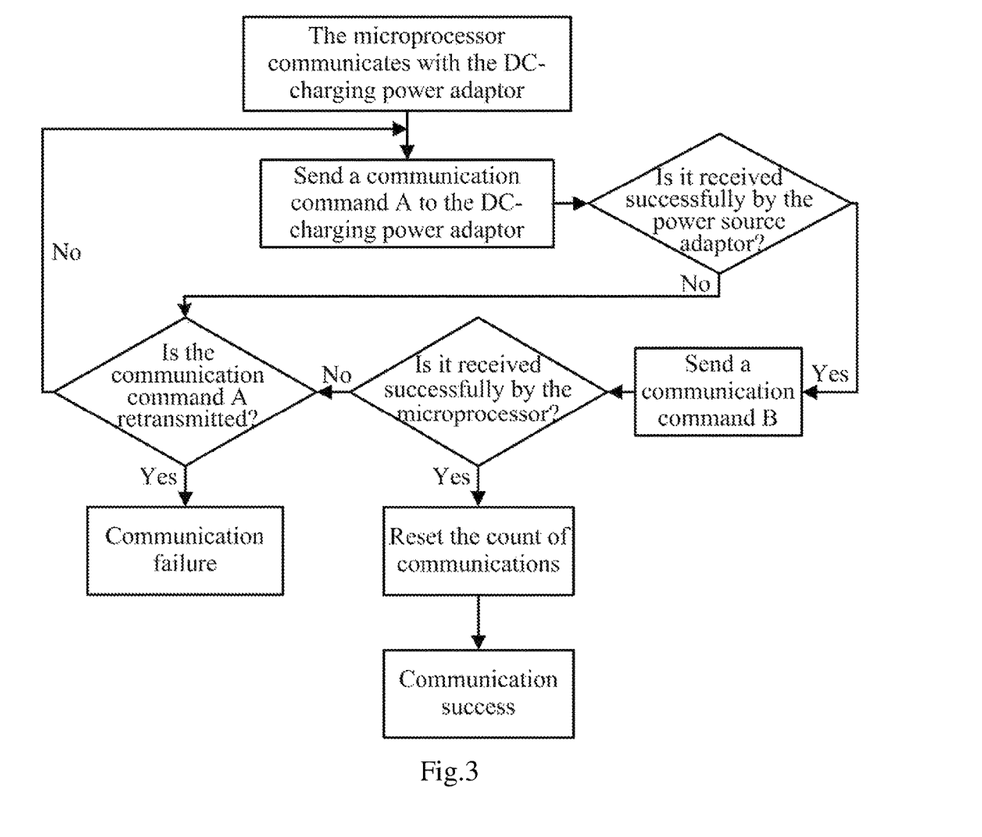
FIG. 3 is a flow chart of an embodiment of detecting communication between the mobile terminal and the DC-charging power source adaptor illustrated in FIG. 1 according to the disclosure.

Communication between the mobile terminal and the DC-charging power source adaptor can be detected in this embodiment preferably in the following flow illustrated in FIG. 3: the microprocessor initiates on its own initiative a communication command A to the external power source adaptor after switching the communication interfaces of the microprocessor from the differential data interfaces DP and DN to the UART interfaces TXD and RXD, and also counts the number of communications. The DC-charging power adaptor receiving successfully the communication command A can respond accordingly, and send a communication command B to the mobile terminal, and if the mobile terminal does not receive any valid communication command B, then the microprocessor will firstly determine the count of communications at that time, and if the count of communications is less than 2, then the microprocessor will retransmits the communication command A for a second attempt on communication; and if the count of communications is more than or equal to 2, then the microprocessor will determine that the communication fails, and disconnect the differential data pins D+ and D− of the USB interface Ji of the mobile terminal from the UART interfaces TXD and RXD of the microprocessor to connect the communication pins D+ and D− of the communication interface with the differential data pins DP and DN of the microprocessor. If the mobile terminal receives successfully the communication command B, then the microprocessor will determine that the communication succeeds, and reset the count of communications, and thereafter can start a timed communication detection mechanism as illustrated in FIG. 4.

In the timed communication detection mechanism, the mobile terminal is timed to send a handshake instruction, e.g., a communication instruction C, to the DC-charging power adaptor, and also increments the count of communications by one; and if the DC-charging power adaptor receives successfully the communication instruction C, then it will feed immediately a response instruction back to the mobile terminal, for example, it will send a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal will retransmit the communication instruction C to the DC-charging power adaptor, and if both of the communications fail, then the mobile terminal will determine that the DC-charging power adaptor engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

For the DC-charging power source adaptor designed in the wireless communication mode, the mobile terminal detecting that the inserted external device is neither the host nor the normal power source adaptor starts the wireless communication module through the microprocessor to communicate wirelessly with the external charging device to thereby determine whether the inserted external device is the DC-charging power source adaptor. The communication detection flow can also be performed as illustrated in FIG. 3 except that the communication commands A and B are transmitted wirelessly.

Figure 4:
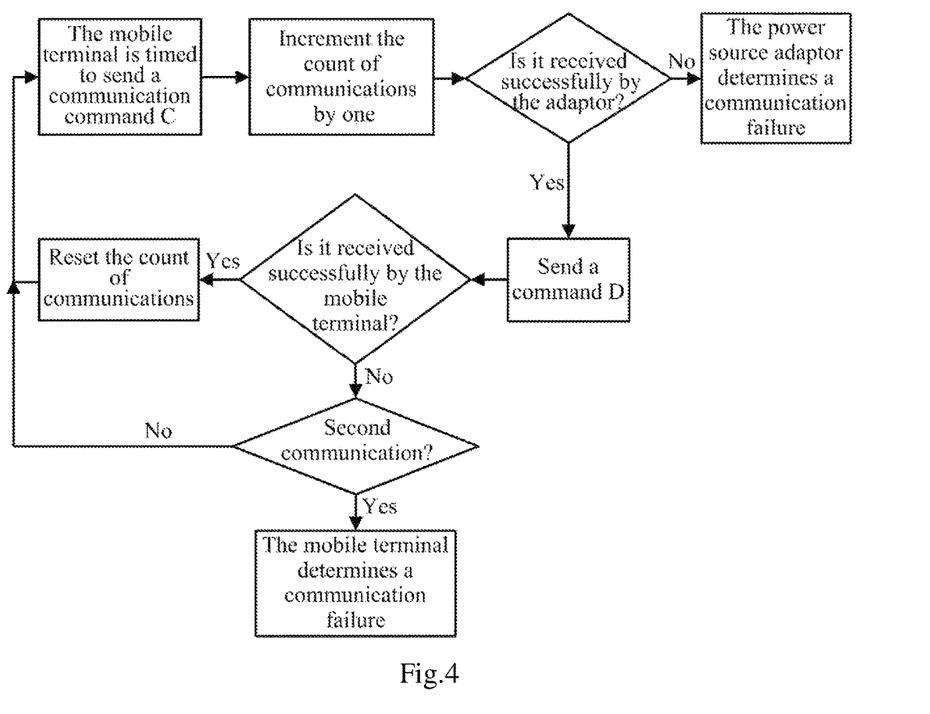
FIG. 4 is a flow chart of an embodiment of a timed detection mechanism of communication between the mobile terminal and the DC-charging power source adaptor illustrated in FIG. 1 according to the disclosure.

The mobile terminal detecting that the inserted external device is the DC-charging power source adaptor can also start the timed communication detection mechanism as illustrated in FIG. 4 for a better switching mechanism and error tolerant mechanism.

In this embodiment, the charging voltage can be adjusted dynamically in a dynamically following mode in which the target charging voltage value is adjusted in real time while following the varying voltage of the battery core.

Figure 5:
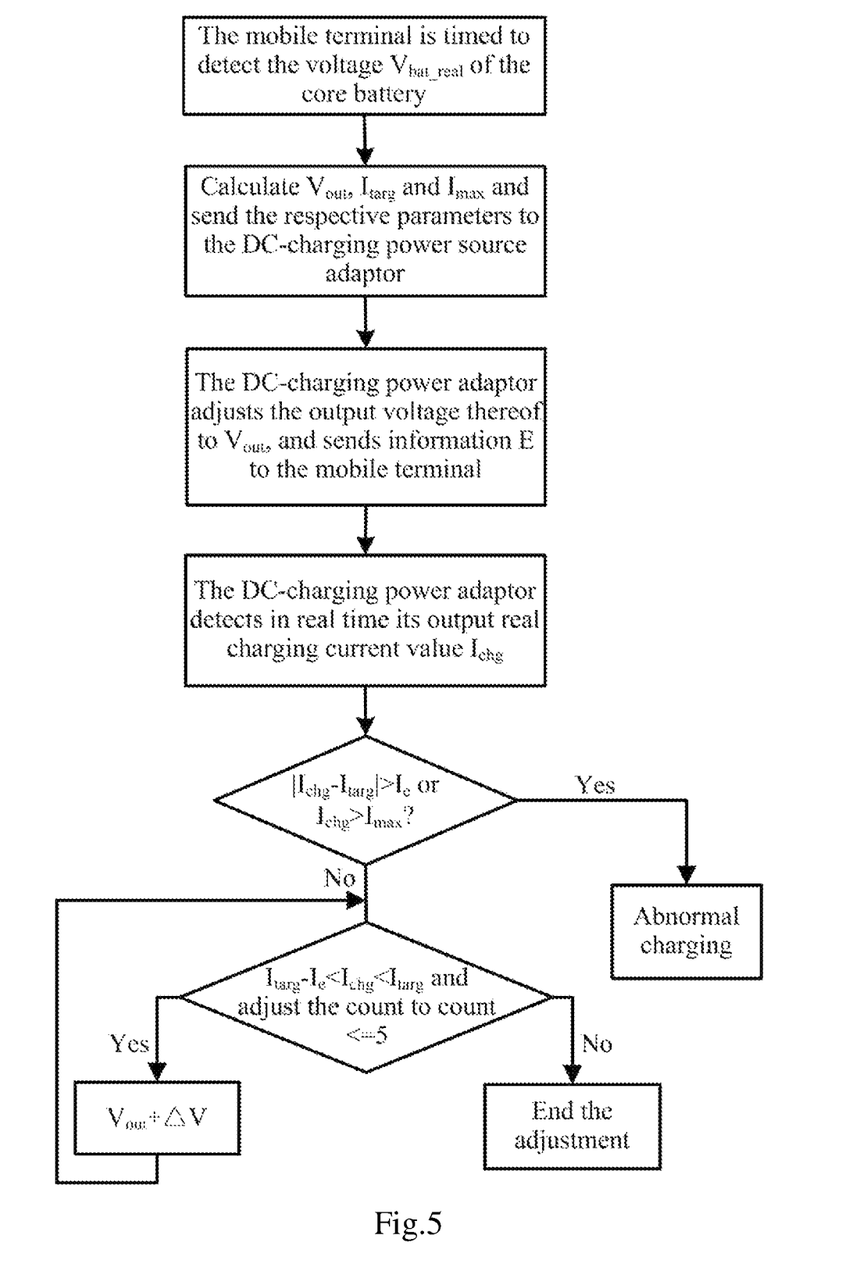
FIG. 5 is a flow chart of control in an embodiment of a voltage-following DC-charging control strategy according to the disclosure.

After entering the DC-charging process, as illustrated in FIG. 5, the microprocessor in the mobile terminal is timed to detect the voltage $V_{bat\_real}$ of the battery core, and calculates a target charging voltage value $V_{out}$ from the voltage $V_{bat\_real}$ of the battery core, and the maximum terminal voltage supported by the battery as well as at least one of a resistance value on the charging line, a resistance value on a circuit board of the mobile terminal, and an inner resistance of the battery. Particularly a charging current maximum value $I_{max}$ can be determined from the voltage $V_{bat\_real}$ of the battery core as well as the maximum terminal voltage supported by the battery, and the inner resistance of the battery; then a target charging current value $I_{targ}$ can be determined from the charging current maximum value $I_{max}$; and next the target charging voltage value $V_{out}$ can be determined from the target charging current value $I_{targ}$ as well as one of the resistance value on the charging line, the resistance value on the circuit board of the mobile terminal, and the inner resistance of the battery.

Preferably the voltage $V_{bat\_real}$ of the battery core can be substituted into the equations below to calculate the target charging voltage value $V_{out}$, the target charging current value $I_{targ}$, and the charging current maximum value $I_{max}$:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat},I_{allow}) \quad (3)$$

Where $R_{line}$ represents the resistance value on the charging line; $R_{board}$ represents the resistance value on the circuit board of the mobile terminal; $R_{bat}$ represents the inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which preferably lies in the range of [150 mA, 250 mA].

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the current target charging voltage value $V_{out}$.

By way of an example, still taking the 4.2V chargeable battery as an example, for the system powered by the battery, from the perspective of the safety of voltage to power the device, the terminal voltage $V_{bat}$ of the battery shall be less than the specified safe value $V_{bat\_safe}$ of the terminal voltage of the battery and no more than a specific $V_{bat\_max}$ dependent upon the platform, and. If the safe value $V_{bat\_safe}$ of the terminal voltage of the battery is $V_{bat\_safe}$=4500 mV, then $V_{bat\_max}$=4470 mV can be taken, so the terminal voltage $V_{bat}$ of the battery is $V_{bat}=V_{bat\_real}+I_{chg}*R_{bat}\leq 4470$.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat},4000) \quad (5)$$

If the inner resistance $R_{bat}$ of the battery is $R_{bat}$=100 mΩ, the other impedance is $R_{line}+R_{board}$=100 mΩ, and $\Delta I$=200 mA, then they can be substituted into Equations (1), (2) and (5) to calculate the currently desirable target charging voltage value $V_{out}$ and target charging current value $I_{out}$, and the charging current maximum value $I_{max}$ from the currently detected voltage $V_{bat\_real}$ of the battery core, and these values can be transmitted by the microprocessor to the DC-charging power source adaptor.

At the DC-charging power source adaptor side, the DC-charging power adaptor adjusts the charging voltage output by the AC-DC module thereof to the received target charging voltage value $V_{out}$ according to the target charging voltage value $V_{out}$. At the end of the adjusting, the DC-charging power adaptor sends information E to the mobile terminal.

At the mobile terminal side, the mobile terminal detects in real time the received real charging current value $I_{chg}$. If $|I_{chg}-I_{targ}|\leq I_e$ and $I_{chg}\leq I_{max}$, then the charging voltage adjusted and then output by the DC-charging power source adaptor is transmitted directly to the battery to DC-charge the battery in the mobile terminal at large current, where the charging current here can rise beyond 3500 mA, to thereby significantly speed up the charging. Here $I_e$ represents a controllable range of the difference between the real charging current value of the DC-charging power adaptor and the target charging current value, and in this embodiment, $I_e$ is preferably set to $I_e$=500 mA. If $|I_{chg}-I_{targ}|>I_e$ or $I_{chg}>I_{max}$, then the DC-charging power adaptor determines abnormal charging. At this time, in order to ensure the safety in charging, the mobile terminal stops the charging process or instructs the DC-charging power source adaptor to block the charging power source output by the AC-DC module thereof to stop the mobile terminal from being charged to thereby avoid the mobile terminal from being damaged.

In reality, the inner resistance of the battery, and the impedance on the line may vary with temperature, aging, and other factors, so the real charging current value $I_{chg}$ output by the DC-charging power adaptor deviates to some extent from the target charging current value $I_{targ}$, thus resulting in some influence upon the charging speed. In order to raise the charging current as much as possible in an allowable range to further speed up charging, in this embodiment, a charging current self-adjusting algorithm is introduced at the mobile terminal end, as illustrated in FIG. 5, that is, after the DC-charging power adaptor adjusts the output voltage to $V_{out}$, the mobile terminal detects in real time the real charging current $I_{chg}$ received by the mobile terminal, and if $I_{targ}-I_e\leq I_{chg}<I_{targ}$, then the target charging voltage value $V_{out}$ is adjusted up by a preset value $\Delta V$ and sent to the DC-charging power source adaptor to boost the charging voltage output by the DC-charging power adaptor. $V_{out}=V_{out}+\Delta V$ can be adjusted progressively so that the real charging current value $I_{chg}$ output by the DC-charging power adaptor approaches progressively the target charging current value $I_{targ}$.

In this embodiment, $V_{out}$ can be preferably adjusted for five times by an amount which can be estimated in Equation (1), and if $V_{bat\_real}$ and R (including the inner resistance of the battery, the line resistance, and all the other impedances) are invariable, then $\Delta V=\Delta I*R$. In this embodiment, $\Delta V$ can be set to $\Delta V$=10 mV.

S207. The microprocessor determines whether the voltage of the battery core goes beyond the range delimited by the DC-charging thresholds, and if not, then the flow returns to the step S206; otherwise, the flow proceeds to the step S208.

S208. The microprocessor controls the DC-charging switch to be opened to disconnect the DC-charging pathway, instructs the DC-charging power adaptor to provide the default constant charging voltage, e.g., 5V DC-charging voltage, and starts the power source managing chip to receive the constant charging voltage to charge the battery at the constant voltage until the battery is fully charged.

In order to ensure the safety of the mobile terminal being charged, the following charging abnormality handling mechanism will be proposed in this embodiment:

1. At the Mobile Terminal Side (1) The mobile terminal detecting that it is being powered by the DC-charging power adaptor is timed to send a handshake instruction to the DC-charging power adaptor, and waits for a preset period of time until the DC-charging power adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power adaptor to output the constant charging voltage, e.g., 5V DC voltage;

(4) After entering the DC-charging process, the mobile terminal detects in real time the received real charging current value $I_{chg}$, and if the absolute value of the difference between $I_{chg}$ and $I_{targ}$ goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value $I_{chg}$, and if $I_{chg}$ is more than $I_{max}$, then it disconnects the DC-charging pathway between the charging interface of the mobile terminal and the battery, and notifies the user of the power source adaptor being abnormal 2. At the DC-Charging Power Adaptor Side (1) The DC-charging power adaptor obtaining the target charging voltage value $V_{out}$, the target charging current value $I_{targ}$, and the charging current maximum value $I_{max}$ detects in real time its output real charging current value $I_{chg}$, and if the absolute value of the difference between $I_{chg}$ and $I_{targ}$ goes beyond the preset controllable range of the difference, then the DC-charging power adaptor stops the charging power source from being output, and flicks a lamp to alert the user;

(2) After entering the DC-charging process, the DC-charging power adaptor detects in real time its output real charging current value $I_{chg}$, and if $I_{chg}$ is more than $I_{max}$, then it determines abnormal charging, and disconnects the charging power source from being output to avoid the mobile terminal from being damaged due to being further powered.

The charging method according to the disclosure can be widely applied to a handset, a tablet computer, a notebook computer, a mobile power source, and other mobile terminals so as to satisfy different charging demands of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal, comprising:
a battery configured to store electric energy, the battery including a battery core;
a USB interface configured to connect with a DC-charging power source adaptor;
a microprocessor configured to detect a voltage of the battery core upon detecting that the USB interface is connected with the DC-charging power source adaptor, and if the voltage of the battery core is in a range [S1, S2] delimited by preset DC-charging thresholds, calculate a target charging voltage value $V_{out}$ based on the voltage of the battery core, a maximum terminal voltage supported by the battery, a resistance value on a charging line, a resistance value on a circuit board of the mobile terminal, and an inner resistance of the battery, and send the target charging voltage value $V_{out}$ to the DC-charging power source adaptor to control the DC-charging power source adaptor to output a charging voltage to charge the battery, wherein the charging voltage is a target charging voltage determined by the DC-charging power source adaptor from the target charging voltage value $V_{out}$; and
a power source managing chip connected between the USB interface and the battery, the microprocessor configured to control the power source to charge the battery in a preset charging mode upon detecting that the voltage of the battery core is out of the range [S1, S2] delimited by the preset DC-charging thresholds.

2. The mobile terminal of claim 1, further comprising a DC switch connected between the USB interface and the battery, the microprocessor configured to control the DC switch to transmit the charging voltage output by the DC-charging power source adaptor directly to the battery to charge the battery upon detecting that the voltage of the battery core is in the range [S1, S2] delimited by the preset DC-charging thresholds.

3. The mobile terminal of claim 1, wherein the microprocessor is configured to, upon detecting that the voltage of the battery core is less than S1, communicate with the DC-charging power source adaptor to instruct the DC-charging power source adaptor to output a constant charging voltage, and start the power source managing chip to pre-charge the battery at a small current; and wherein the microprocessor is configured to, upon detecting that the voltage of the battery core is more than S2, instruct the DC-charging power source adaptor to output a constant charging voltage, and start the power source managing chip to charge the battery at the constant charging voltage.

4. A rapid charging method, comprising:
  detecting, by a mobile terminal, a voltage of a battery core in a battery of the mobile terminal;
  if the voltage of the battery core is out of a range [S1, S2] delimited by preset DC-charging thresholds, charging the battery in a preset charging mode;
  if the voltage of the battery core is in the range [S1, S2] delimited by the preset DC-charging thresholds, calculating a target charging voltage value $V_{out}$ based on the voltage of the battery core, a maximum terminal voltage supported by the battery, a resistance value on a charging line, a resistance value on a circuit board of the mobile terminal, and an inner resistance of the battery, and sending the target charging voltage value $V_{out}$ to a DC-charging power source adaptor; and
  transmitting, by the mobile terminal, a charging voltage output by the DC-charging power source adaptor to the battery to charge the battery, wherein the charging voltage is a target charging voltage determined by the DC-charging power source adaptor from the target charging voltage value $V_{out}$.

5. The rapid charging method of claim 4, wherein:
  the target charging voltage value $V_{out}$ is determined based on a target charging current value $I_{targ}$;
  the target charging current value $I_{tug}$ is determined based on a charging current maximum value $I_{max}$; and
  the charging current maximum value $I_{max}$ is determined based on the maximum terminal voltage supported by the battery and the inner resistance of the battery.

6. The rapid charging method of claim 5, further comprising:
  detecting, by the mobile terminal, a real charging current $I_{chg}$ received by the mobile terminal; and
  if the real charging current $I_{chg}$ is less than the target charging current value $I_{targ}$, adjusting up the target charging voltage value $V_{out}$ by a preset value.

7. The rapid charging method of claim 5, further comprising:
  detecting, by the mobile terminal, a real charging current $I_{chg}$ received by the mobile terminal; and
  if the absolute value of the difference between the real charging current $I_{chg}$ and the target charging current value $I_{targ}$ is more than a preset value representing a controllable range of the difference between the real charging current value and the target charging current value, stopping the battery from being charged.

8. The rapid charging method of claim 5, further comprising:
  detecting, by the mobile terminal, a real charging current $I_{chg}$ received by the mobile terminal; and
  if the real charging current $I_{chg}$ is larger than the charging current maximum value $I_{max}$, stopping the battery from being charged.

9. The rapid charging method of claim 5, wherein $V_{out}$, $I_{targ}$ and $I_{max}$ are calculated in the equations of:

$$V_{out}=V_{bat\_real}+I_{targ}*(R_{line}+R_{board}+R_{bat});$$

$$I_{targ}=I_{max}-\Delta I;\text{ and}$$

$$I_{max}=\min((V_{bat\_max}-V_{bat\_real})/R_{bat},I_{allow}),$$

wherein $V_{bat\_real}$ represents the voltage of the battery core, $R_{line}$ represents the resistance value on the charging line, $R_{board}$ represents the resistance value on the circuit board of the mobile terminal, $R_{bat}$ represents the inner resistance value of the battery, $V_{bat\_max}$ represents the maximum terminal voltage value supported by the battery, $I_{allow}$ represents the maximum safe charging current value selected while ensuring the safety of the battery being charged, and $\Delta I$ represents a preset difference in current.

10. The rapid charging method of claim 4, wherein charging the battery in a preset charging mode includes:
  instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
  instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

11. The rapid charging method of claim 5, wherein charging the battery in a preset charging mode includes:
  instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
  instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

12. The rapid charging method of claim 6, wherein charging the battery in a preset charging mode includes:
  instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
  instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

13. The rapid charging method of claim 7, wherein charging the battery in a preset charging mode includes:
  instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
  instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

14. The rapid charging method of claim 8, wherein charging the battery in a preset charging mode includes:
   instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
   instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

15. The rapid charging method of claim 9, wherein charging the battery in a preset charging mode includes:
   instructing, by the mobile terminal, upon detecting that the voltage of the battery core is less than S1, the DC-charging power source adaptor to output a constant charging voltage, transmit the constant charging voltage to a power source managing chip, and start the power source managing chip to pre-charge the battery at a small current; and
   instructing, by the mobile terminal, upon detecting that the voltage of the battery core is more than S2, the DC-charging power source adaptor to output the constant charging voltage, transmit the constant charging voltage to a power source managing chip, and start the power source managing chip to charge the battery at the constant charging voltage.

* * * * *